(12) United States Patent
Hsu et al.

(10) Patent No.: US 11,573,364 B2
(45) Date of Patent: Feb. 7, 2023

(54) BACKLIGHT MODULE AND ELECTRONIC DEVICE COMPRISING THE SAME

(71) Applicant: InnoLux Corporation, Miao-Li County (TW)

(72) Inventors: Wei-Tsung Hsu, Miao-Li County (TW); Hui-Wen Su, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 17/808,942

(22) Filed: Jun. 24, 2022

(65) Prior Publication Data

US 2023/0008532 A1 Jan. 12, 2023

(30) Foreign Application Priority Data

Jul. 9, 2021 (CN) .......................... 202110779779.1
Jun. 10, 2022 (CN) .......................... 202210658958.4

(51) Int. Cl.
*F21V 8/00* (2006.01)

(52) U.S. Cl.
CPC ......... *G02B 6/0051* (2013.01); *G02B 6/0055* (2013.01); *G02B 6/0073* (2013.01)

(58) Field of Classification Search
CPC ... G02B 6/0051; G02B 6/0055; G02B 6/0073
See application file for complete search history.

(56) References Cited

U.S. PATENT DOCUMENTS

| 8,013,948 | B2 * | 9/2011 | Park | G02F 1/133603 |
| | | | | 362/633 |
| 9,971,197 | B2 * | 5/2018 | Song | F21V 7/04 |
| 2005/0280752 | A1 * | 12/2005 | Kim | G02F 1/133611 |
| | | | | 349/62 |
| 2020/0326594 | A1 * | 10/2020 | Chang | G02F 1/133605 |

FOREIGN PATENT DOCUMENTS

| CN | 102109101 A | 6/2011 |
| TW | 201027193 A | 7/2010 |

OTHER PUBLICATIONS

Miyashita et al.,WO-2013187058-A1, Dec. 2013 (Year: 2013).*

* cited by examiner

*Primary Examiner* — Mary Ellen Bowman
(74) *Attorney, Agent, or Firm* — Muncy, Geissler, Olds & Lowe, P.C.

(57) ABSTRACT

A backlight module and an electronic device including the same are provided. The electronic device includes: a panel; and a backlight module disposed opposite to the panel and including: a light guide plate; a first optical unit disposed on the light guide plate and having a first prism structure; a second optical unit disposed on the first optical unit and having a second prism structure; and a third optical unit disposed on the second optical unit and having a third prism structure, wherein the first prism structure faces the light guide plate, and the second prism structure and the third prism structure face the panel.

20 Claims, 11 Drawing Sheets

BACKLIGHT MODULE AND ELECTRONIC DEVICE COMPRISING THE SAME

CROSS REFERENCE TO RELATED APPLICATION

This application claims the benefits of the Chinese Patent Application Serial Number 202110779779.1 and 202210658958.4, respectively filed on Jul. 9, 2021 and Jun. 10, 2022, the subject matter of which is incorporated herein by reference.

BACKGROUND

1. Field

The present disclosure relates to a backlight module and an electronic device comprising the same. More specifically, the present disclosure relates to a backlight module including an optical unit with a specific design and an electronic device comprising the same.

2. Description of Related Art

With the continuous development of technology, electronic devices are oriented towards privacy-proof, low-power consumption, high-quality or low-cost designs. Nowadays, most electronic devices with concentrated light sources are obtained by attaching a privacy sheet on the electronic device, or using a collimated backlight module, etc., to achieve privacy effects. However, the above methods still have disadvantages such as high energy consumption, high cost or low yield.

Therefore, it is desirable to provide a novel backlight module and/or electronic device to improve the above-mentioned problems.

SUMMARY

The present disclosure provides an electronic device, comprising: a panel; and a backlight module opposite to the panel and comprising: a light guide plate; a first optical unit disposed on the light guide plate and having a first prism structure; a second optical unit disposed on the first optical unit and having a second prism structure; and a third optical unit disposed on the second optical unit and having a third prism structure, wherein the first prism structure faces the light guide plate, and the second prism structure and the third prism structure face the panel.

The present disclosure also provides an electronic device, comprising: a panel; and a backlight module opposite to the panel and comprising: a light guide plate; a first optical unit disposed on the light guide plate; a second optical unit disposed on the first optical unit; and a third optical unit disposed on the second optical unit and having a third prism structure and a surface opposite to the third prism structure, wherein the third prism structure comprises a plurality of sharp corner portions and a plurality of rounded corner portions, one of the plurality of rounded corner portions is disposed between two adjacent sharp corner portions of the plurality of sharp corner portions, and a height from one of the plurality of rounded corner portions to the surface of the third optical unit is less than a height of one of the plurality of sharp corner portions to the surface of the third optical unit in a normal direction of the panel.

Other novel features of the disclosure will become more apparent from the following detailed description when taken in conjunction with the accompanying drawings.

DETAILED DESCRIPTION OF EMBODIMENT

Figure 1:
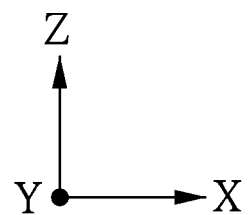
FIG. 1 is a schematic cross-sectional view of an electronic device according to one embodiment of the present disclosure.
Figure 1:
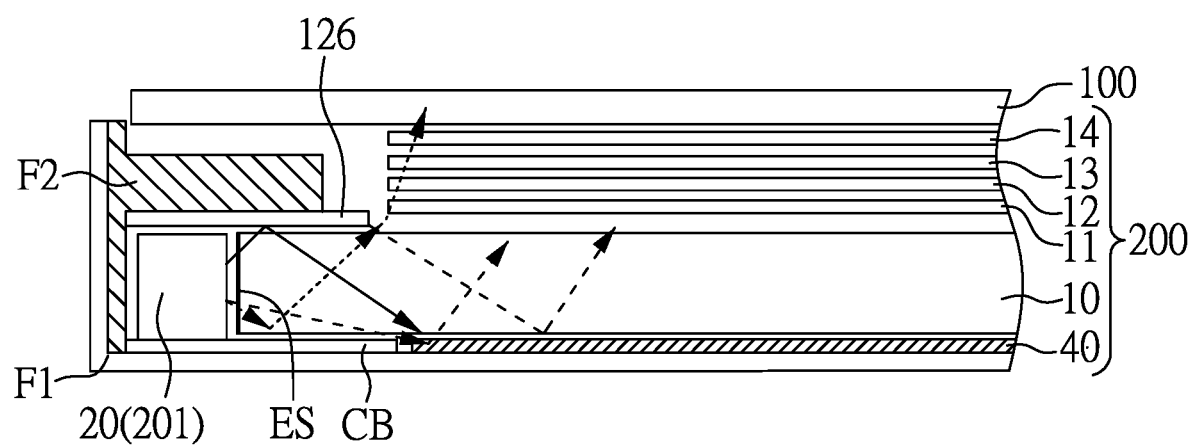

The following is specific embodiments to illustrate the implementation of the present disclosure. Those who are familiar with this technique can easily understand the other advantages and effects of the present disclosure from the content disclosed in the present specification.

The present disclosure can also be implemented or applied by other different specific embodiments, and various details in the present specification can also be modified and changed according to different viewpoints and applications without departing from the spirit of the present disclosure.

It should be noted that, in the present specification, when a component is described to have an element, it means that the component may have one or more of the elements, and it does not mean that the component has only one of the element, except otherwise specified.

Furthermore, the ordinals recited in the specification and the claims such as "first", "second", "third" and so on are intended only to describe the elements claimed and imply or represent neither that the claimed elements have any proceeding ordinals, nor that sequence between one claimed element and another claimed element or between steps of a manufacturing method. The use of these ordinals is merely to differentiate one claimed element having a certain designation from another claimed element having the same designation.

In the specification and the appended claims of the present disclosure, certain words are used to refer to specific elements. Those skilled in the art should understand that electronic device manufacturers may refer to the same components by different names. The present specification does not intend to distinguish between elements that have the same function but have different names.

In the following description and claims, words such as "comprising", "including", "containing", and "having" are open-ended words, so they should be interpreted as meaning "containing but not limited to . . . ". Therefore, when the terms "comprising", "including", "containing" and/or "having" are used in the description of the present disclosure, they specify the existence of corresponding features, regions, steps, operations and/or components, but do not exclude the existence of one or more corresponding features, regions, steps, operations and/or components.

In the present disclosure, the terms "almost", "about" and "approximately" usually mean within 10%, within 5%, within 3%, within 2%, within 1%, or within 0.5% of a given value or range. The quantity given here is an approximate quantity, that is, without specifying "almost", "about" and "approximately", it can still imply "almost", "about" and "approximately". In addition, the terms "in a range from a first value to a second value" and "in a range between a first value and a second value" mean the said range comprises the first value, the second value and other values between the first value and the second value.

In the present specification, except otherwise specified, the terms (including technical and scientific terms) used herein have the meanings generally known by a person skilled in the art. It should be noted that, except otherwise specified in the embodiments of the present disclosure, these terms (for example, the terms defined in the generally used dictionary) should have the meanings identical to those known in the art, the background of the present disclosure or the context of the present specification, and should not be read by an ideal or over-formal way.

In addition, relative terms such as "below" or "under" and "on", "above" or "over" may be used in the embodiments to describe the relative relationship between one element and another element in the drawings. It will be understood that if the device in the drawing was turned upside down, elements described on the "lower" side would then become elements described on the "upper" side. When a unit (for example, a layer or a region) is referred to as being "on" another unit, it can be directly on the another unit or there may be other units therebetween. Furthermore, when a unit is said to be "directly on another unit", there is no unit therebetween. Moreover, when a unit is said to be "on another unit", the two have a top-down relationship in a top view, and the unit can be disposed above or below the another unit, and the top-bottom relationship depends on the orientation of the device.

In the present disclosure, the measurement methods of thickness, length and width may be measured by using an optical microscope, and the thickness may be measured by a cross-sectional image in an electron microscope; but the present disclosure is not limited thereto. In addition, any two values or directions used for comparison may have certain errors. If the first value is equal to the second value, it implies that there may be an error of about 10% between the first value and the second value. If the first direction is perpendicular to the second direction, the angle between the first direction and the second direction may be between 80° and 100°. If the first direction is parallel to the second direction, the angle between the first direction and the second direction may be between 0° and 10°.

It should be noted that the technical solutions provided by different embodiments hereinafter may be replaced, combined or used in combination, so as to constitute another embodiment without violating the spirit of the present disclosure.

Figure 2:
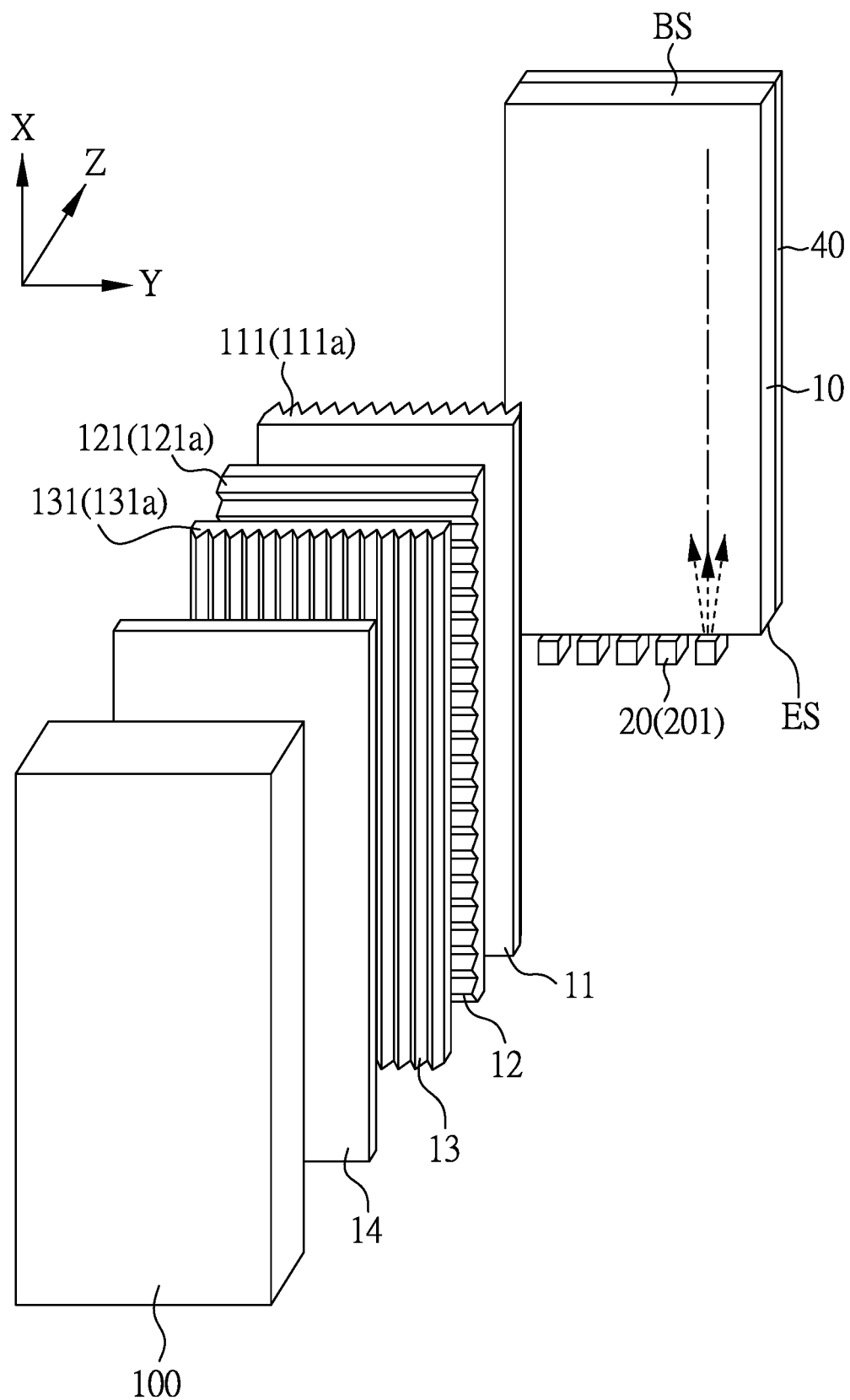
FIG. 2 is a stereoscopic view of an electronic device according to one embodiment of the present disclosure.
Figure 3A:
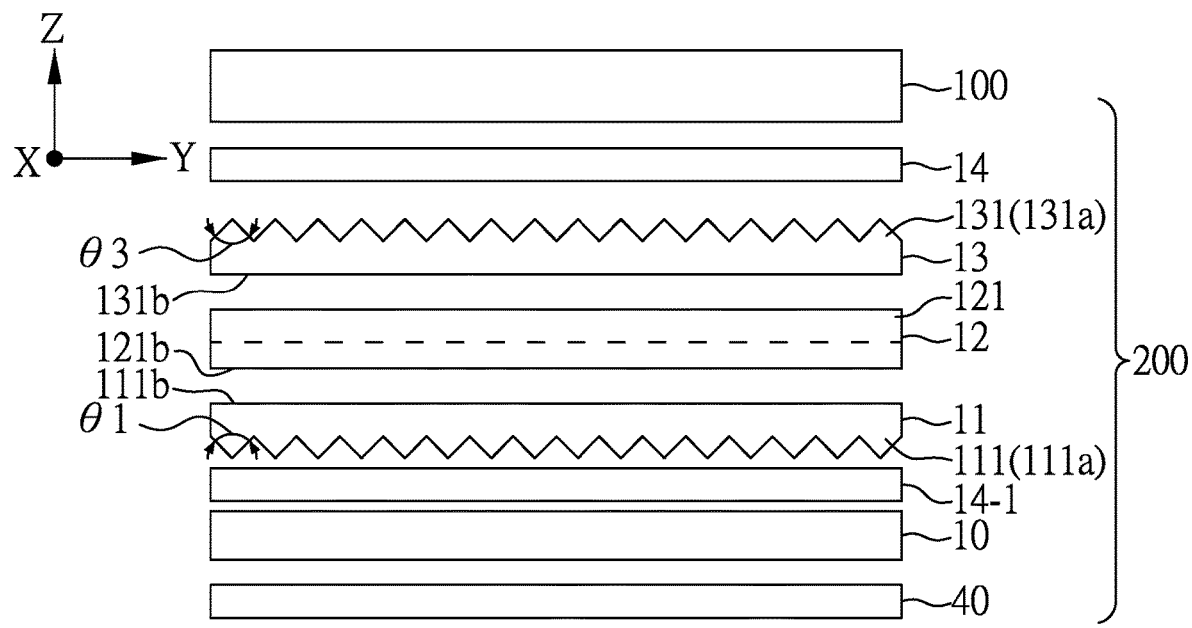
FIG. 3A and FIG. 3B are partial schematic views of an electronic device according to one embodiment of the present disclosure.
Figure 3B:
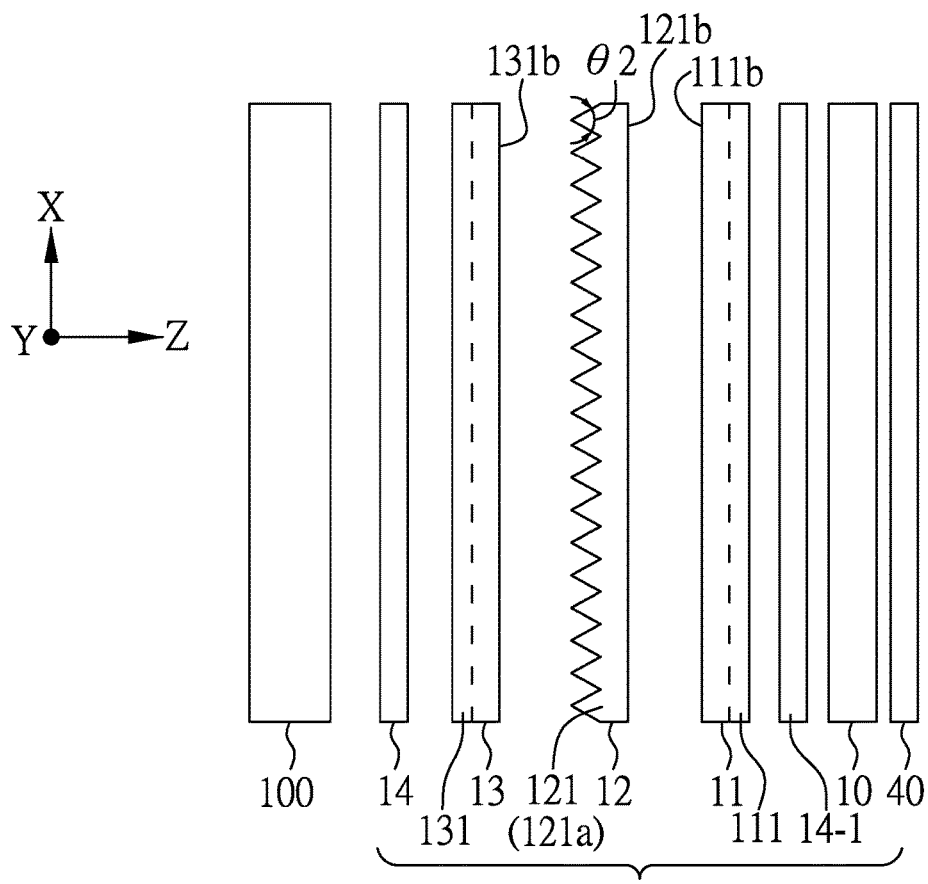

FIG. 1 is a schematic cross-sectional view of an electronic device according to one embodiment of the present disclosure. FIG. 2 is a stereoscopic view of an electronic device according to one embodiment of the present disclosure. FIG. 3A and FIG. 3B are partial schematic views of an electronic device according to one embodiment of the present disclosure. As shown in FIG. 1, FIG. 2, FIG. 3A and FIG. 3B, the electronic device of the present disclosure comprises: a panel 100; and a backlight module 200 opposite to the panel 100 and comprising: a light guide plate 10; a first optical unit 11 disposed on the light guide plate 10 and having a first prism structure 111; a second optical unit 12 disposed on the first optical unit 11 and having a second prism structure 121; and a third optical unit 13 disposed on the second optical unit 12 and having a third prism structure 131, wherein the first prism structure 111 faces the light guide plate 10, and the second prism structure 121 and the third prism structure 131 face the panel 100. More specifically, as shown in FIG. 2, FIG. 3A and FIG. 3B, the first prism structure 111 may have a plurality of first strip structures 111a and a surface 11b opposite to the plurality of first strip structures 111a. The second prism structure 121 may have a plurality of second strip structures 121a and a surface 121b opposite to the plurality of second strip structures 121a. The third prism structure 131 may have a plurality of third strip structures 131a and a surface 131b opposite to the plurality of third strip structures 131a. "The first prism structure 111 facing the light guide plate 10" refers that the first strip structures 111a are closer to the light guide plate 10 than the surface 11b. "The second prism structure 121 facing the panel 100" refers that the second strip structures 121a are closer to the panel 100 than the surface 121b. "The third prism structure 131 facing the panel 100" refers that the third strip structures 131a are closer to the panel 100 than the surface 131b.

It should be understood that, although only the panel 100 is shown in the drawings, the panel 100 may include upper and lower substrates, display units, sealing members, alignment layers, polarizers, light shielding layers, color filter layers and/or driving elements etc., but the present disclosure is not limited thereto.

In the present disclosure, as shown in FIG. 1 and FIG. 2, the backlight module 200 may further comprise a reflective structure 40 disposed under the light guide plate 10. The reflective structure 40 is used to reflect the light emitting from the bottom of the light guide plate 10, so the light can travel toward the panel 100 to improve the utilization rate of the light. In some embodiments, the material of the reflective structure 40 is not particularly limited and may comprise, for example, a metal, a white ink, other reflective materials or a combination thereof. Herein, the metal may include gold (Au), silver (Ag), copper (Cu), aluminum (Al) or a combination thereof; but the present disclosure is not limited thereto. In addition, the reflective structure 40 may comprise a single or multi-layer reflective sheet.

As shown in FIG. 1 and FIG. 2, the backlight module 200 may further comprise a light source 20, the light source 20 may comprises a plurality of light emitting units 201, and the plurality of light emitting units 201 may be arranged, for example, along a first direction Y. In some embodiments, the light source 20 may comprise a light emitting diode, and the light emitting diode may include, for example, an organic light emitting diode (OLED), a mini LED, a micro LED or a quantum dot LED (which may include QLED or QDLED), fluorescence, phosphor or other suitable materials or a combination thereof; but the present disclosure is not limited thereto. In some embodiments, the backlight module 200 may comprise a frame F1 and/or a support frame F2, wherein the frame F1 may be used to accommodate the aforesaid light source 20, the light guide plate 10 or the aforesaid optical films (for examples, the first optical unit 11, the second optical unit 12 and/or the third optical unit 13) and the support frame F2; but the present disclosure is not limited thereto. The panel 100 may be disposed, for example, on the support frame F2. In some embodiments, the material of the frame F1 and/or the support frame F2 may include a metal, a plastic, a ceramic, other suitable materials or a combination thereof; but the present disclosure is not limited thereto. In some embodiments, the backlight module 200 may comprise a circuit board CB, wherein the circuit board CB may comprise a rigid circuit board (for example, a printed circuit board (PCB)) or a flexible circuit board (for example, a flexible printed circuit (FPC)). An active driving unit or a passive driving unit may be included on the circuit board CB. The circuit board CB may be used to control the light output of the light source 20. However, the present disclosure is not limited thereto.

In some embodiments, the backlight module 200 may further comprise a reflective unit 126, wherein the reflective unit 126 may be disposed adjacent to the light source 20 and the light receiving surface ES of the light guide plate 10, and the reflective unit 126 may be disposed on the light source 20 and/or part of the light guide plate 10. In some embodiments, the reflective unit 126 may include a material with high reflectivity, for example, a material with a reflectivity between 70% and 99% ($70\% \leq$ reflectivity $\leq 99\%$); but the present disclosure is not limited thereto. In some embodiments of the present disclosure, the material of the reflective unit 126 may include a metal, a white ink, a white tape, other suitable reflective materials or a combination thereof; but the present disclosure is not limited thereto. The reflective unit 126 can be used to reflect the light generated by the light source 20 to the light guide plate 10 to reduce light loss, reduce light leakage or improve the brightness of the electronic device.

Hereinafter, the detail structures of the first optical unit 11, the second optical unit 12 and the third optical unit 13 of the present disclosure are described below.

As shown in FIG. 2, the light source 20 may comprise a plurality of light emitting units 201, and the plurality of light emitting units 201 are arranged along a first direction Y. An extension direction of the first prism structure 111 may be, for example, perpendicular to the first direction Y; an extension direction of the second prism structure 121 may be, for example, parallel to the first direction Y; and an extension direction of the third prism structure 131 may be, for example, perpendicular to the first direction Y; but the present disclosure is not limited thereto. Herein, the "perpendicular" means that the included angle between the extension direction of the aforesaid prism structure and the first direction Y is in a range from 87° to 93° ($87° \leq$ included angle $\leq 93°$); and the "parallel" means that the included angle between the extension direction of the aforesaid prism structure and the first direction Y is in a range from 0° to 6° ($0° \leq$ included angle $\leq 6°$).

More specifically, as shown in FIG. 1 and FIG. 2, the first prism structure 111 may have a plurality of first strip structures 111a, and the extension direction of the first prism structure 111 refers to the extension direction of the first strip structures 111a. Similarly, the second prism structure 121 may have a plurality of second strip structures 121a, and the extension direction of the second prism structure 121 refers to the extension direction of the second strip structures 121a. Similarly, the third prism structure 131 may have a plurality of third strip structures 131a, and the extension direction of the third prism structure 131 refers to the extension direction of the third strip structures 131a.

FIG. 3A and FIG. 3B are partial schematic views of an electronic device according to one embodiment of the present disclosure. For the convenience of description, parts of the structure of the electronic device, for example, the light source 20, the light emitting units 201, the reflective unit 126, the circuit board CB, the frame F1 and/or the support frame F2 are not shown in FIG. 3A and FIG. 3B. FIG. 3A and FIG. 3B respectively correspond to cross-sectional views of FIG. 2 in different directions.

As shown in FIG. 2, FIG. 3A and FIG. 3B, an extension direction of the first prism structure 111 may be, for example, perpendicular to the first direction Y; an extension direction of the second prism structure 121 may be, for example, parallel to the first direction Y; and an extension direction of the third prism structure 131 may be, for example, perpendicular to the first direction Y; but the present disclosure is not limited thereto. The first prism structure 111 (for example, the first strip structures 111a) may have a first top angle θ1, the second prism structure 121 (for example, the second strip structures 121a) may have a second top angle θ2, and the third prism structure 131 (for example, the third strip structures 131a) may have a third top angle θ3. In some embodiments, the first top angle θ1 and/or the third top angle θ3 may be respectively in a range from 87° to 93° ($87° \leq θ1 \leq 93°$; $87° \leq θ3 \leq 93°$) or may be respectively in a range from 88° to 92° ($88° \leq θ1 \leq 92°$; $88 \leq θ3 \leq 92°$), but the present disclosure is not limited thereto. In some embodiments, the first top angle θ1 and the third top angle θ3 may be the same or different. In some embodiments, the second top angle θ2 may be in a range from 50° to 60° ($50° \leq θ2 \leq 60°$) or in a range from 52° to 58° ($52° \leq θ2 \leq 58°$); but the present disclosure is not limited thereto.

In some embodiments, the refractive index n1 of the first optical unit 11, the refractive index n2 of the second optical unit 12 and/or the refractive index n3 of the third optical unit 13 may be respectively in a range from 1.45 to 1.60 ($1.45 \leq n1 \leq 1.60$; $1.45 \leq n2 \leq 1.60$; $1.45 \leq n3 \leq 1.60$) or respectively in a range from 1.48 to 1.58 ($1.48 \leq n1 \leq 1.58$; $1.48 \leq n2 \leq 1.58$; $1.48 \leq n3 \leq 1.58$); but the present disclosure is not limited thereto. In some embodiments, the refractive index n1, the refractive index n2 and/or the refractive index n3 may be the same or different. In some embodiments, the material of the first optical unit 11, the second optical unit 12 and/or the third optical unit 13 may include a transparent material; but the present disclosure is not limited thereto. In some embodiments, the first optical unit 11, the second optical unit 12 and/or the third optical unit 13 may include a base (not shown in the figure) and the corresponding prism structure (for example, the first prism structure 111, the second prism structure 121 and the third prism structure 131). The material of the aforesaid base or prism structure may include polycarbonate (PC), polyimide (PI), polyethylene terephthalate (PET), polyether polyol (POP), polymethylmethacrylate (PMMA), cycloolefin polymer (COP), rubber, glass, other suitable materials or a combination thereof; but the present disclosure is not limited thereto. In some embodiments, the material of the aforesaid prism structure may include photo curing adhesive, thermal curing adhesive, photo-thermal curing adhesive, moisture curing adhesive, other suitable materials or a combination thereof; but the present disclosure is not limited thereto. In some embodiments, the material of the prism structure may comprise optical clear adhesive (OCA), optical clear resin (OCR), acrylic resin, other suitable materials or a combination thereof. In some embodiments, the first optical unit 11, the second optical unit 12 and the third optical unit 13 may be manufactured by the same material or different materials.

In the backlight module 200 of the present disclosure, the light emitting from the backlight module 200 may be concentrated toward the front viewing angle by the arrangement of the first optical unit 11, the second optical unit 12 and the third optical unit 13, for example, the angle relationship between the first direction Y (the arrangement direction of the light emitting units 201) and the first prism structure 111, the second prism structure 121 as well as the third prism structure 131 or the relationship between the first prism structure 111, the second prism structure 121 and the third prism structure 131 facing or away from the light guide plate 10 respectively. A detail description will be given later through the optical analysis results of FIG. 4A to FIG. 4D. In addition, the effect of light concentration toward the front viewing angle may be further achieved through the angle design of the first top angle θ1 of the first prism structure 111, the second top angle θ2 of the second prism structure 121 and/or the third top angle θ3 of the third prism structure 131. When the backlight module 200 of the present disclosure is combined with the panel 100, an electronic device with more concentrated light toward the front viewing angle can be obtained. Therefore, the privacy requirements can be achieved without additionally attaching or arranging privacy protection sheets, or without using collimated backlight modules with low yield and/or high cost.

In some embodiments, the surface 121b of the second optical unit 12 may be a rough surface, and a haze of the surface 121b may be in a range from 3% to 15% (3% ≦ haze ≦ 15%) or in a range from 5% to 12% (5% ≦ haze ≦ 12%); but the present disclosure is not limited thereto. The haze design of the surface 121b can reduce the risk of the adhesion between the second optical unit 12 and the first optical unit 11 to improve the display taste defects.

As shown in FIG. 1 to FIG. 3B, the backlight module 200 may further comprise a diffusor 14 disposed on the third optical unit 13. In some embodiments, the backlight module 200 may further comprise another diffusor 14-1 disposed between the first optical unit 11 and the light guide plate 10; but the present disclosure is not limited thereto. In some embodiments, the haze of the diffusor 14 and/or the diffusor 14-1 may be respectively in a range from 5% to 50% (5° ≦ haze ≦ 50%) or respectively in a range from 30% to 50% (30% ≦ haze ≦ 50%); but the present disclosure is not limited thereto. In some embodiments, the diffusor 14 can be used to disperse the light emitting from the light source 20 to make the brightness of the backlight module 200 more uniform. In some embodiments, the haze the surface 121b of the second optical unit 12 may be prepared by embossing, sandblasting or other suitable processes; but the present disclosure is not limited thereto.

FIG. 4A to FIG. 4D show the optical analysis results of the electronic device with different aspects of the backlight modules according to one embodiment of the present disclosure. More specifically, FIG. 4A to FIG. 4D show the optical analysis results of the electronic devices comprising the backlight modules 200 with different optical films, and these optical analysis results are obtained under, for example, the electronic device comprising the panel 100 and the backlight module. These optical analysis results can be obtained by, for example, measuring with a conoscopic lens; but the present disclosure is not limited thereto. For example, the optical analysis result may be measured or analyzed using Conoscope, BM5A, Conometer80U or other suitable instruments; but the present disclosure is not limited thereto.

It should be noted that the optical analysis results of FIG. 4A to FIG. 4D may include an azimuth angle φ (the azimuth angle from 0 degree to 360 degrees in the figure) and the inclination angle θ (the inclination angle from 0 degree to 80 degrees in the figure). The inclination angle θ is, for example, the included angle with the normal direction of the panel 100, and the inclination angle θ of 0 degree may represent the vertical direction to the upper surface of the panel 100. The azimuth angle φ is, for example, an angle in a direction parallel to the upper surface of the panel 100. The position where the azimuth angle φ is 90 degrees may approximately correspond to the position of the light receiving surface ES (as shown in FIG. 2) of the light guide plate 10, and the position where the azimuth angle φ is 270 degrees may approximately correspond to the position of the opposite surface BS opposite to the light receiving surface ES (as shown in FIG. 2) of the light guide plate 10. In addition, the right color scales in FIG. 4A to FIG. 4D represent different ranges of luminance per unit area (cd/m²), and the range of the luminance per unit area (cd/m²) is only to illustrate the results of a certain embodiment; but the present disclosure is not limited thereto. The luminance per unit area may vary depending on the design of the panel 100 or other factors.

Figure 4A:
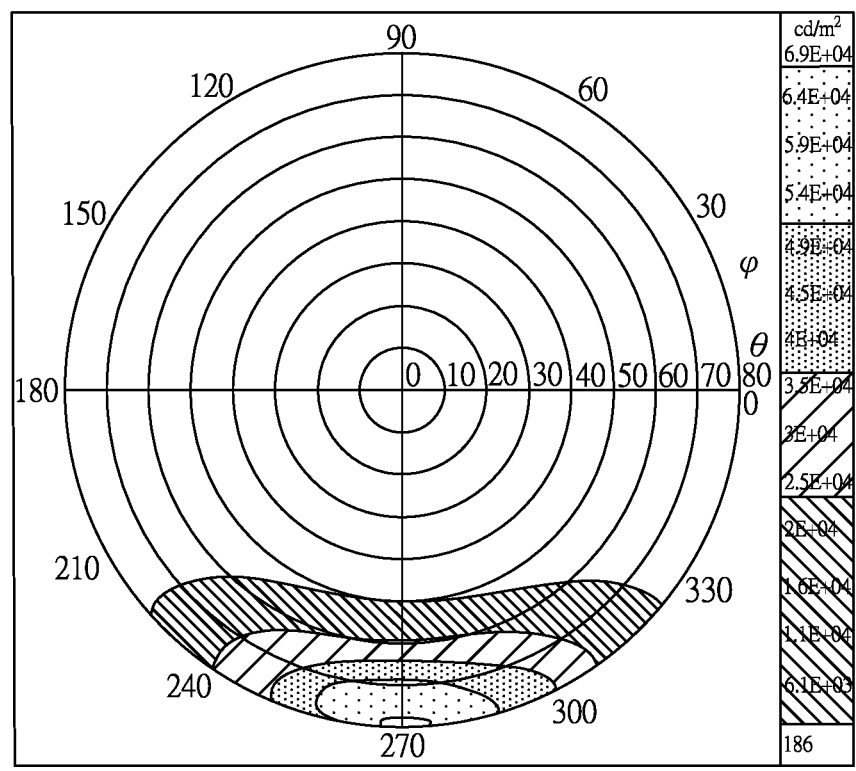
FIG. 4A to FIG. 4D show the optical analysis results of the electronic device with different aspects of the backlight modules according to one embodiment of the present disclosure.
Figure 4B:
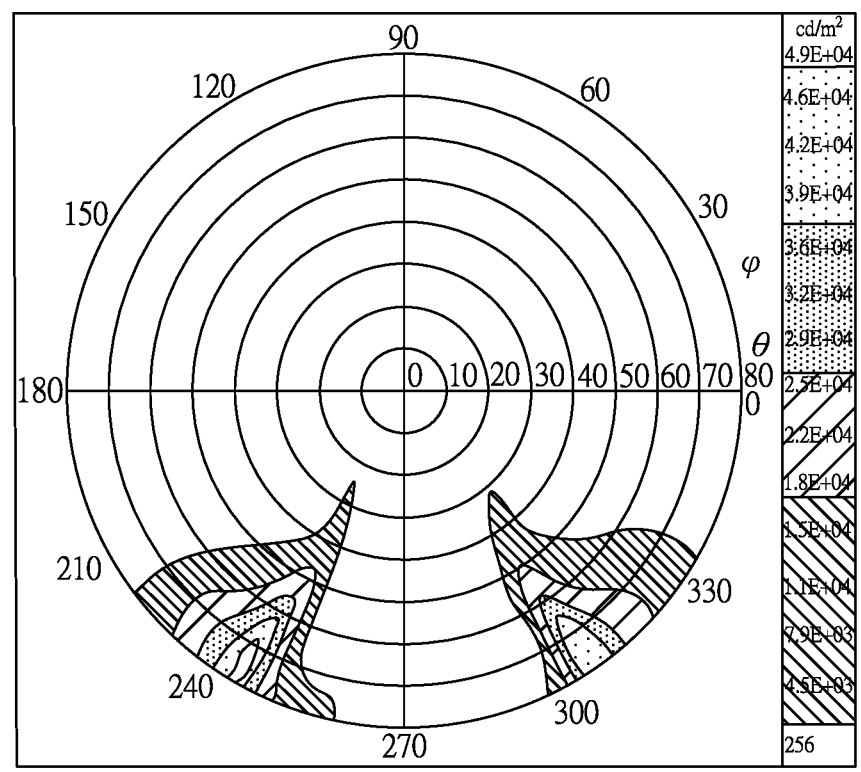
Figure 4C:
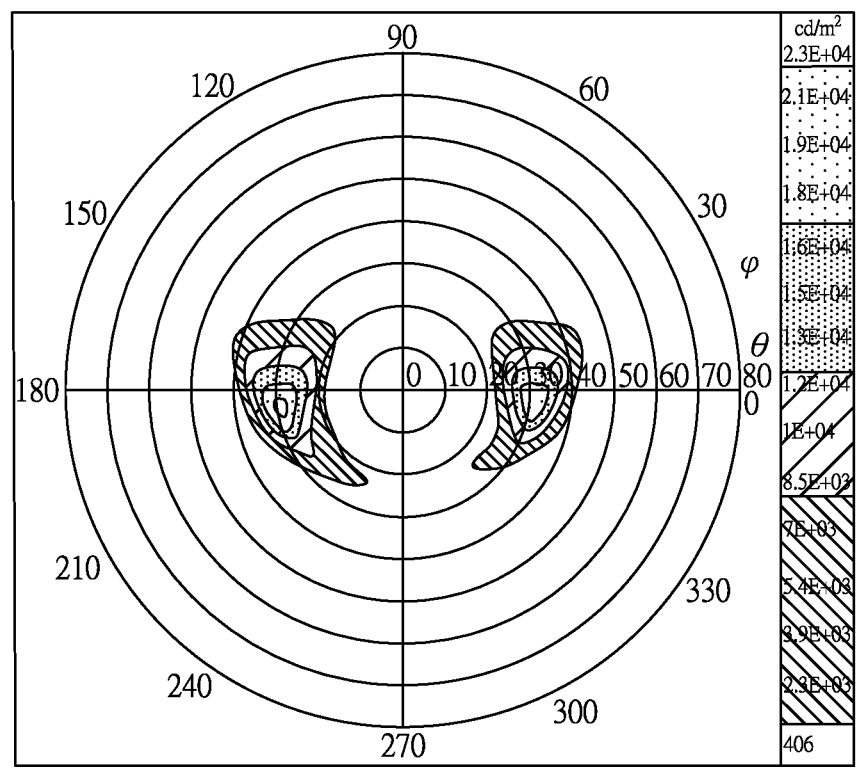
Figure 4D:
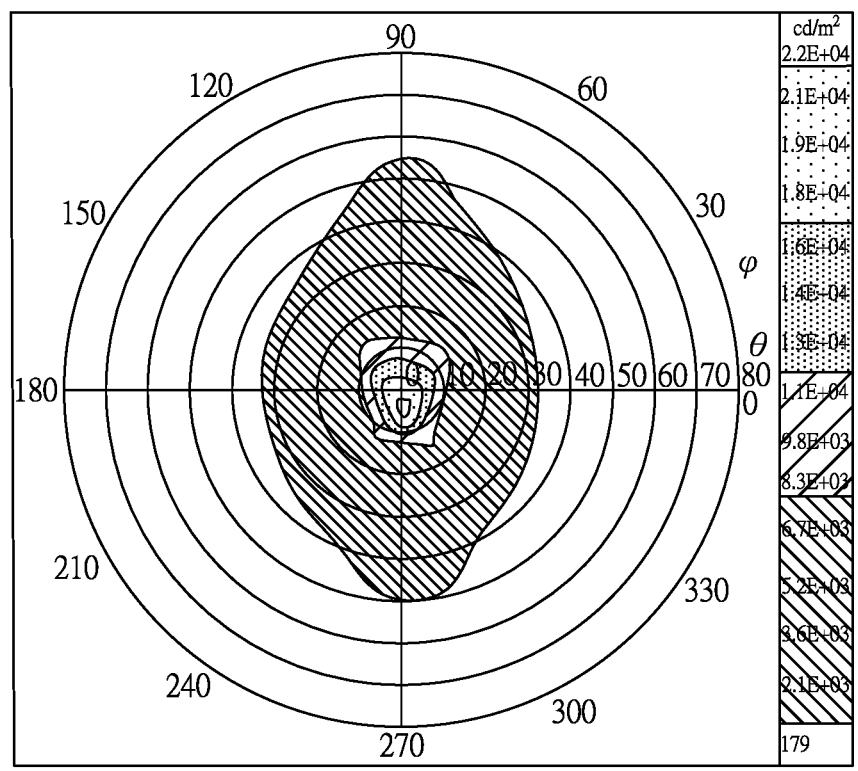

As illustrated above, FIG. 4A to FIG. 4D respectively show the optical analysis results of the electronic devices comprising the backlight modules 200 with different optical films. For example, when the backlight module only comprises the light guide plate 10, the optical analysis result of the measured electronic device is shown in FIG. 4A. When the backlight module comprises not only the light guide plate 10 but also the aforesaid first optical unit 11, the optical analysis result of the measured electronic device is shown in FIG. 4B. When the backlight module comprises not only the light guide plate 10 but also the aforesaid first optical unit 11 and the second optical unit 12, the optical analysis result of the measured electronic device is shown in FIG. 4C. When the backlight module comprises not only the light guide plate 10 but also the aforesaid first optical unit 11, the second optical unit 12 and the third optical unit 13, the optical analysis result of the measured electronic device is shown in FIG. 4D.

In detail, as shown in FIG. 4A, when the backlight module 200 only comprises the light guide plate 10, the part of the luminance per unit area of more than 2.5E+04 cd/m² can be located in the range of the azimuth angle φ between 240 degrees and 310 degrees, and the inclination angle θ is between 60 degrees and 80 degrees; but the present disclosure is not limited thereto. In other words, when the light source 20 emits light to the light guide plate 10, the light may be concentrated, for example, at the position of the opposite surface BS opposite to the light receiving surface ES. When the first optical unit 11, the second optical unit 12 and the third optical unit 13 are sequentially disposed on the light guide plate 10 in the backlight module 200, the optical analysis results may be sequentially changed, for example, as shown in FIG. 4B to FIG. 4D. In detail, as shown in FIG. 4B, when the light passes through the light guide plate 10 and the first optical unit 11, the light may be approximately divided into two parts by the first optical unit 11 (the lower left part and the lower right part in FIG. 4B). The part where the luminance per unit area is greater than 2.5E+04 cd/m$^2$ in the lower left part may approximately correspond to the position where the azimuth angle φ is about 230 degrees to 250 degrees, and the inclination angle θ is about 60 degrees to 80 degrees. The part where the luminance per unit area is greater than 2.5E+04 cd/m$^2$ in the lower right part may approximately correspond to the position where the azimuth angle φ is about 300 degrees to 320 degrees, and the inclination angle θ is about 60 degrees to 80 degrees. However, the present disclosure is not limited thereto. As shown in FIG. 4C, when the light passes through the light guide plate 10, the first optical unit 11 and the second optical unit 12, the light splitting of the two parts shown in FIG. 4B (the lower left part and the lower right part) may be changed, for example, towards the position of the front viewing angle (i.e. the inclination angle θ is getting closer to 0 degree). For example, the two parts shown in FIG. 4B may approximately correspond to the position where the inclination angle θ is about 60 degrees to 80 degrees, while the position of the two parts shown in FIG. 4C is changed to the position where the inclination angle θ is about 20 degrees to 40 degrees; but the present disclosure is not limited thereto. In other words, when the light further passes through the second optical unit 12, the two parts of the split light may be concentrated towards the front viewing angle. In addition, as shown in FIG. 4D, when the light passes through the light guide plate 10, the first optical unit 11, the second optical unit 12 and the third optical unit 13, the aforesaid two parts of the split light may be concentrated together, so the light can be concentrated to the position of the front viewing angle of the electronic device. By the design of the relationship between the light guide plate 10, the first optical unit 11, the second optical unit 12 and the third optical unit 13 in the backlight module 200, the electronic device has the characteristic of concentrating light toward the front viewing angle, so the backlight module can be used for privacy protection or can improve the brightness of the front viewing angle to reduce energy consumption or improve the contrast ratio.

Figure 5:
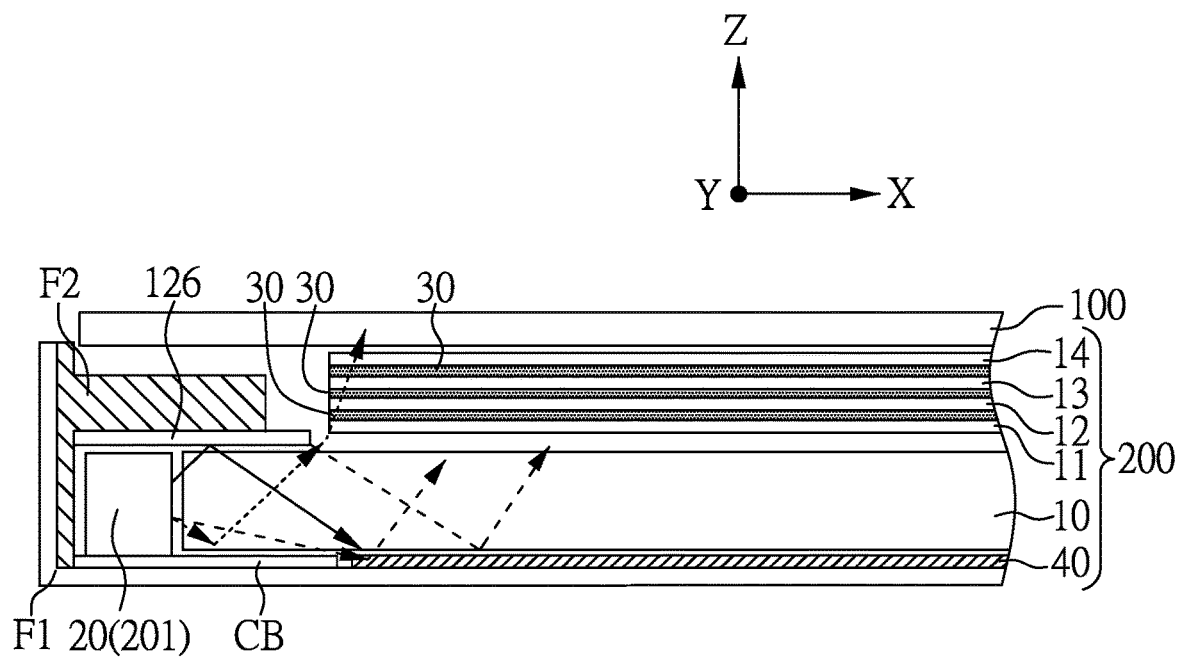
FIG. 5 is a schematic cross-sectional view of an electronic device according to one embodiment of the present disclosure.

FIG. 5 is a schematic cross-sectional view of an electronic device according to one embodiment of the present disclosure. The electronic device of FIG. 5 is similar to that shown in FIG. 1, except for the following differences.

The backlight module 200 shown in FIG. 5 may further comprise at least one adhesive layer 30, and the adhesive layer 30 may be disposed between the first optical unit 11 and second optical unit 12 or between the second optical unit 12 and the third optical unit 13. In some embodiments, the adhesive layer 30 may be selectively disposed between the third optical unit 13 and the diffusor 14; but the present disclosure is not limited thereto. In some embodiments, the backlight module 200 may comprise at least one adhesive layer 30, and the adhesive layer(s) 30 may be selectively respectively disposed between the first optical unit 11, the second optical unit 12, the third optical unit 13 and the diffusor 14. In some embodiments, the first optical unit 11, the second optical unit 12, the third optical unit 13 and/or the diffusor 14 may be adhered to each other through the adhesive layer(s) 30 to form an optical film set; but the present disclosure is not limited thereto.

In some embodiment, the adhesive layer 30 may comprise photo curing adhesive, thermal curing adhesive, photo-thermal curing adhesive, moisture curing adhesive, tape, other suitable materials or a combination thereof; but the present disclosure is not limited thereto. In some embodiments, the adhesive layer 30 may comprise polyvinyl butyral (PVB), ethylene-vinyl acetate (EVA), thermoplastic polyurethane (TPU), optical clear adhesive (OCA), optical clear resin (OCR), other suitable material or a combination thereof; but the present disclosure is not limited thereto. By using the adhesive layer 30, the relative positional deviation between layers can be reduced, or the assembly procedure can be reduced.

Figure 6:
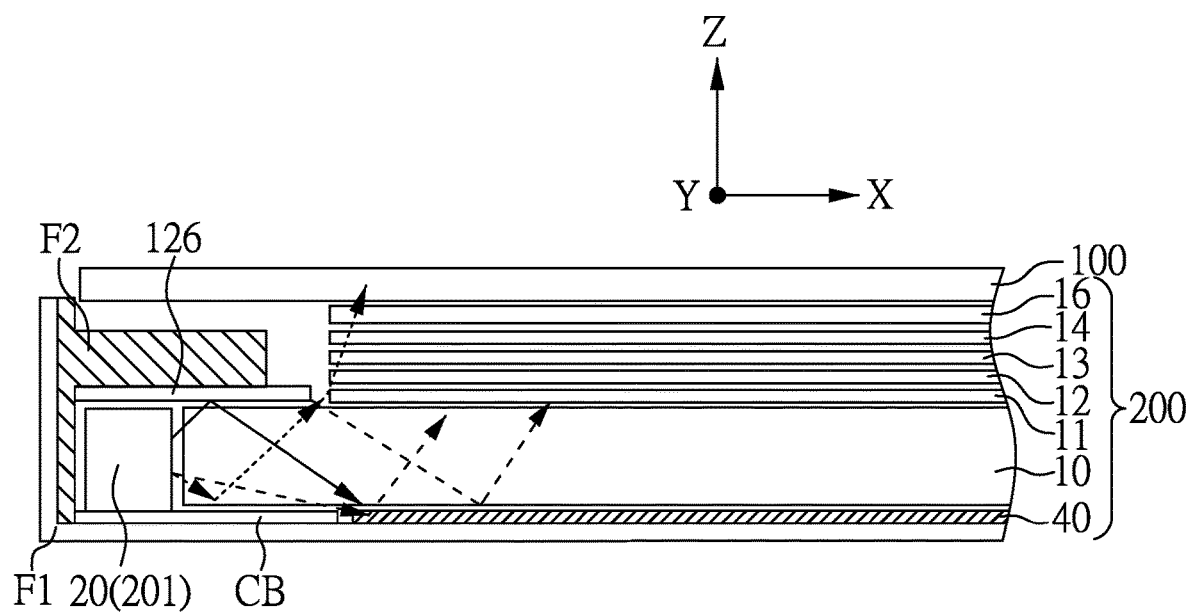
FIG. 6 is a schematic cross-sectional view of an electronic device according to one embodiment of the present disclosure.

FIG. 6 is a schematic cross-sectional view of an electronic device according to one embodiment of the present disclosure. The electronic device of FIG. 6 is similar to that shown in FIG. 1, except for the following differences.

The backlight module 200 shown in FIG. 6 may further comprise a grating unit 16 disposed between the third optical unit 13 and the panel 100. For example, the diffusor 14 may be disposed between the grating unit 16 and the third optical unit 13. In other embodiments (not shown in the figure), an adhesive layer may be selectively disposed between the grating unit 16 and the diffusor 14 to adhere to each other. In some embodiments, the grating unit 16 may comprise an advanced light control film (ALCF), a view control film (VCF) or other suitable light contrail films; but the present disclosure is not limited thereto. In some embodiments, the grating unit 16 may be used to control the viewing angle of the electronic device.

Figure 7:
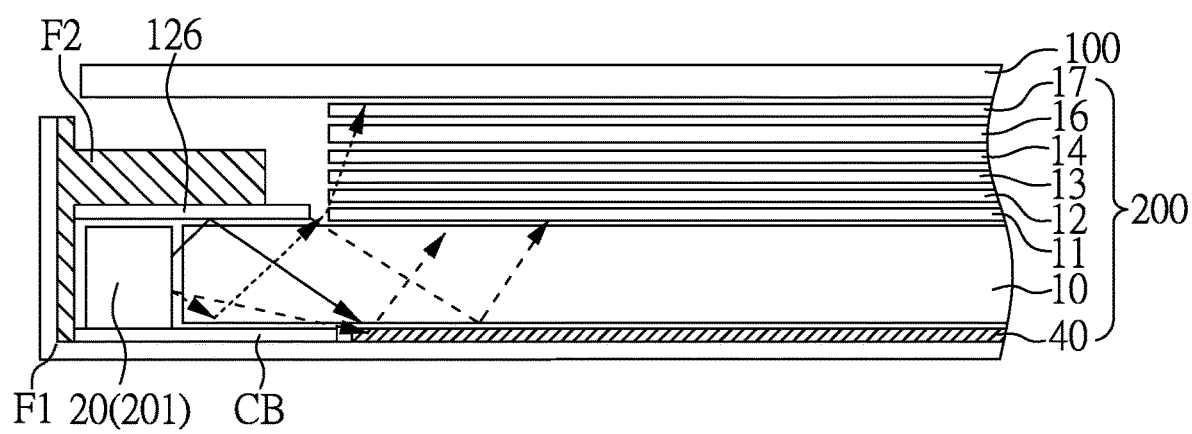
FIG. 7 is a schematic cross-sectional view of an electronic device according to one embodiment of the present disclosure.

FIG. 7 is a schematic cross-sectional view of an electronic device according to one embodiment of the present disclosure. The electronic device of FIG. 7 is similar to that shown in FIG. 6, except for the following differences.

The backlight module 200 shown in FIG. 7 may further comprise a reflective composite layer 17 disposed between the third optical unit 13 and the panel 100. In some embodiment, the aforesaid diffusor 14 and/or grating unit 16 may be selectively disposed between the reflective composite layer 17 and the third optical unit 13, and the grating unit 16 may be disposed, for example, between the reflective composite layer 17 and the diffusor 14. In other embodiments (not shown in the figure), an adhesive layer may be selectively disposed between the reflective composite layer 17 and the grating unit 16 or between the grating unit 16 and the diffusor 14 to adhere each other; but the present disclosure is not limited thereto. In some embodiments, the reflective composite layer 17 may comprise a dual brightness enhancement film (DBEF) or an advanced polarizer film (APF); but the present disclosure is not limited thereto. The reflective composite layer 17 is used to improve the utilization rate of the light source and reduce the energy consumption of the electronic device.

Figure 8:
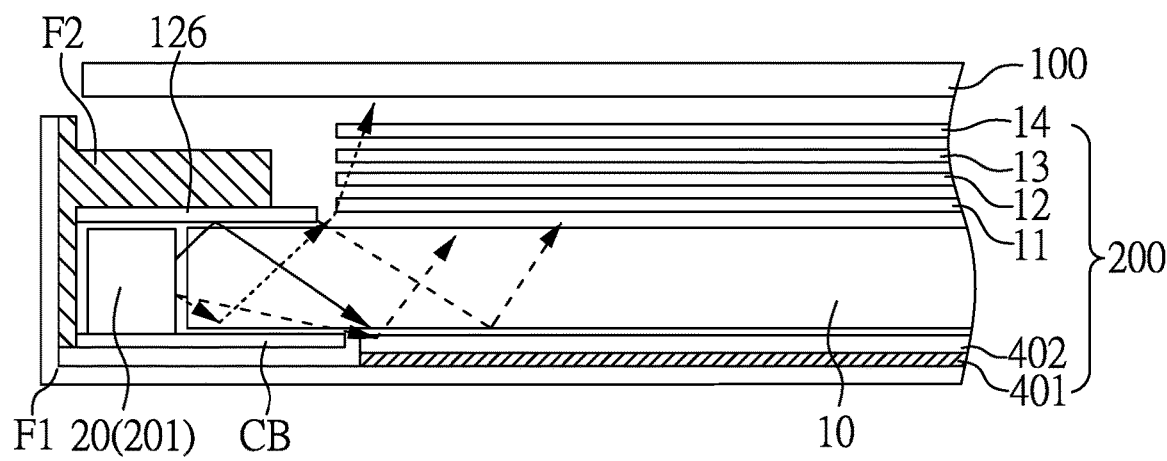
FIG. 8 is a schematic view of an electronic device according to one embodiment of the present disclosure.
Figure 8:
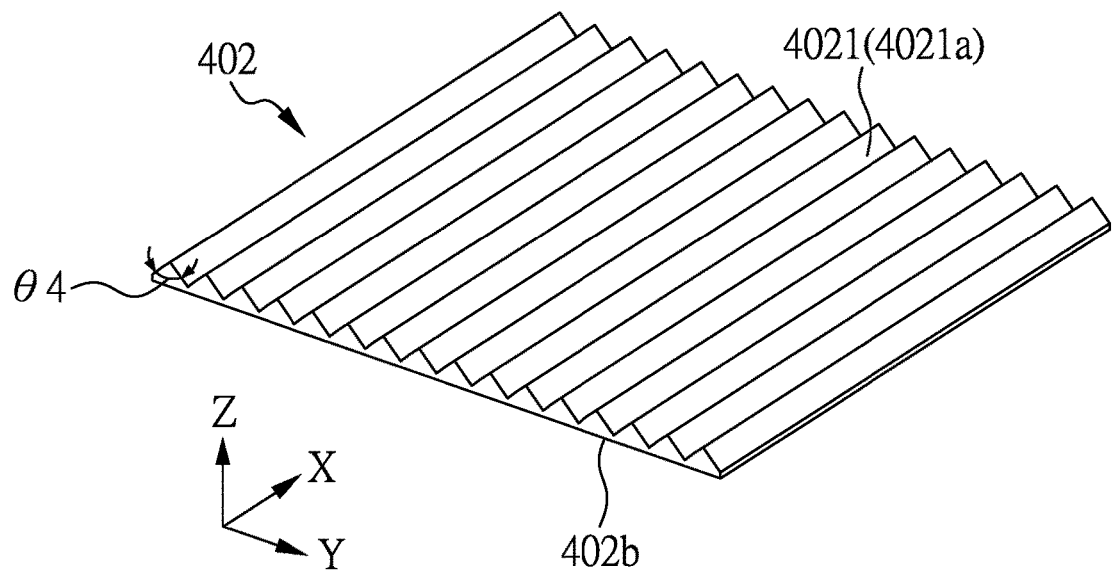

FIG. 8 is a schematic view of an electronic device according to one embodiment of the present disclosure. The electronic device of FIG. 8 is similar to that shown in FIG. 1, except for the following differences.

The backlight module 200 shown in FIG. 8 may further comprise a light absorbing layer 401 and a fourth optical unit 402. The light absorbing layer 401 may be disposed, for example, under the light guide plate 10, i.e. the light guide plate 10 may be disposed, for example, between the light absorbing layer 401 and the panel 100. In some embodiments, the fourth optical unit 402 may be disposed, for example, between the light guide plate 10 and the light absorbing layer 401. In some embodiment, air may be present between the fourth optical unit 402 and the light guide plate 10. In some embodiments, the light guide plate 10 may be disposed between the fourth optical unit 402 and the panel 100. In some embodiments, the fourth optical unit 402 may have a fourth prism structure 4021, and the fourth prism structure 4021, for example, faces the light guide plate 10. More specifically, the fourth prism structure 4021 may have a plurality of fourth strip structures 4021a and a surface 402b opposite to the plurality of fourth strip structures 4021a, and "the fourth prism structure 4021 facing the light guide plate 10" refers that the fourth strip structures 4021a are closer to the light guide plate 10 than the surface 402b. In some embodiments, the light emitting units 201 are arranged along a first direction Y, and an extension direction of the fourth prism structure 4021 may be, for example, perpendicular to the first direction Y; but the present disclosure is not limited thereto. Herein, the "perpendicular" means that the included angle between the extension direction of the aforesaid prism structure and the first direction Y is in a range from 87° to 93° (87° ≦ included angle ≦ 93°). More specifically, the fourth prism structure 4021 may have a plurality of fourth strip structures 4021a, and the extension direction of the fourth prism structure 4021 refers to the extension direction of the fourth strip structures 4021a of the fourth prism structure 4021. In some embodiments, the fourth strip structures 4021a of the fourth prism structure 4021 may have a fourth top angle θ4, and the fourth top angle θ4 may be in a range from 87° to 93° (87° ≦ θ4 ≦ 93°) or in a range from 89° to 91° (89° ≦ θ4 ≦ 91°); but the present disclosure is not limited thereto. In some embodiments, the material or the preparation method of the fourth optical unit 402 may be, for example, the same as those of the first optical unit 11, the second optical unit 12 and/or the third optical unit 13, and are not described again.

In some embodiments, in the backlight module 200 shown in FIG. 8, the reflectivity of the light absorbing layer 401 may be in a range from 0% to 25% (0%<reflectivity ≦ 25%) or in a range from 0% to 10% (0%<reflectivity ≦ 10%); but the present disclosure is not limited thereto. In some embodiment, the absorption rate of the light absorbing layer 401 may be in a range from 75% to 100% (75% ≦ absorption rate<100%) or in a range from 90% to 100% (90% ≦ absorption rate<100%); but the present disclosure is not limited thereto. In some embodiments, the material of the light absorbing layer 401 may include a high light absorption material, a low reflection material or a combination thereof, but the present disclosure is not limited thereto. In some embodiment, the material of the light absorbing layer 401 may include particles, coatings, glue, other suitable materials or a combination thereof, but the present disclosure is not limited thereto. In some embodiments, the light absorbing layer 401 may comprise a black organic material, a black inorganic material, polyethylene terephthalate, black ink, a black tape, other suitable materials or a combination thereof, but the present disclosure is not limited thereto. In some embodiments, the light absorbing layer 401 may be formed through a chemical vapor deposition process, a coating process, an evaporation process, an electroplating process, a sputtering process, a lamination process, a printing process, a baking paint process or other suitable processes, but the present disclosure is not limited thereto. In some embodiments, the light absorbing layer 401 can be used to reduce the chance of the stray light emitting from the bottom surface of the light guide plate 10 (i.e. the side close to the light absorbing layer 401) being reflected back to the light guide plate 10, thereby reducing the brightness of the large viewing angle, improving the contrast of the electronic device at the front viewing angle or improving the brightness of the electronic device at the front viewing angle. For example, the normal direction Z of the panel 100 is defined as 0 degree, and the front viewing angle is within a range of ±30 degrees (or ±40 degrees) with the normal direction Z of the panel 100; but the present disclosure is not limited thereto.

Figure 9:
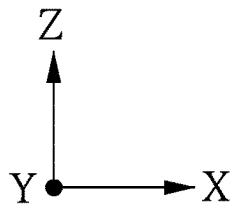
FIG. 9 is a schematic view of an electronic device according to one embodiment of the present disclosure.
Figure 9:
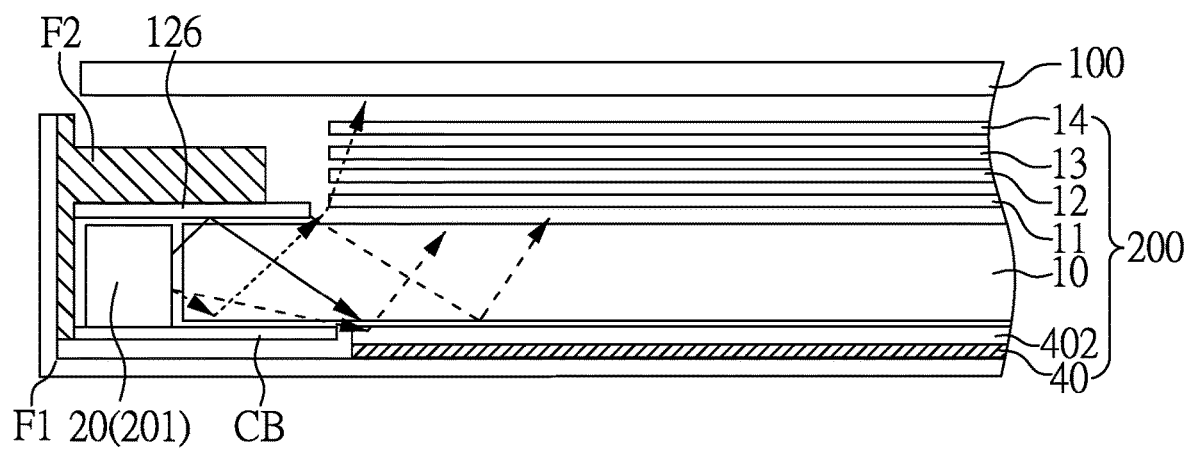
Figure 9:
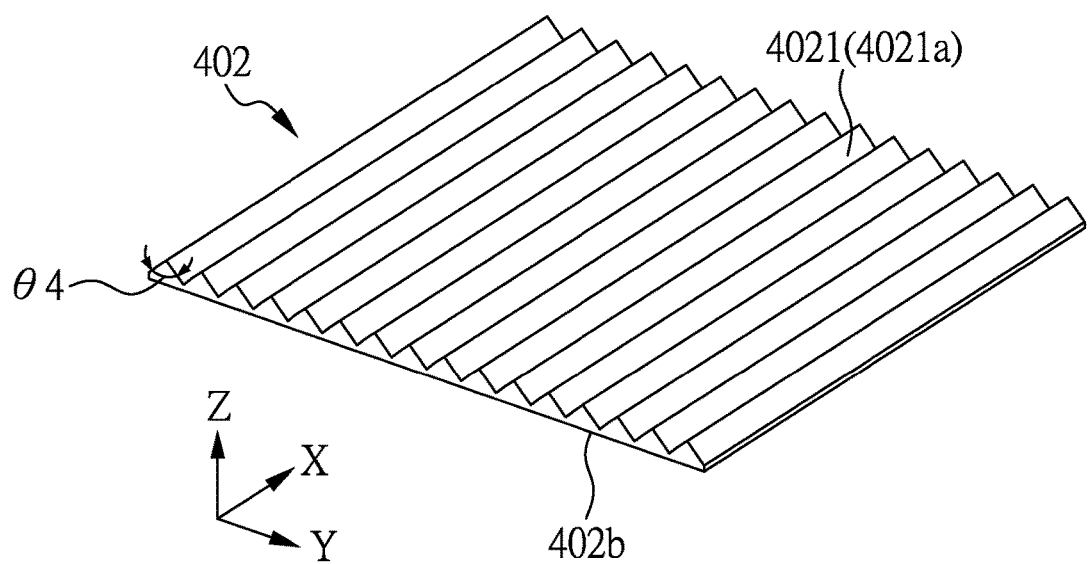

FIG. 9 is a schematic view of an electronic device according to one embodiment of the present disclosure. The electronic device of FIG. 9 is similar to that shown in FIG. 1, except for the following differences.

The backlight module 200 shown in FIG. 9 may further comprise a reflective structure 40 and a fourth optical unit 402, and the reflective structure 40 may be disposed under the light guide plate 10, i.e. the fourth optical unit 402 may be disposed between the reflective structure 40 and the light guide plate 10. The reflective structure 40 may comprise a single structure a multi-layer structure. The material of the reflective structure 40 can be referred to that of the reflective structure 40 shown in FIG. 1, and is not described again. In some embodiments, the reflective structure 40 may comprise an advanced polarizer film (APF), but the present disclosure is not limited thereto. In some embodiment, the fourth optical unit 402 between the reflective structure 40 and the light guide plate 10 may have a fourth prism structure 4021, and the fourth prism structure 4021, for example, faces the light guide plate 10. More specifically, the fourth prism structure 4021 may have a plurality of fourth strip structures 4021a and a surface 402b opposite to the plurality of fourth strip structures 4021a, and "the fourth prism structure 4021 facing the light guide plate 10" refers that the fourth strip structures 4021a are closer to the light guide plate 10 than the surface 402b. The fourth strip structures 4021a of the fourth prism structure 4021 may have a fourth top angle θ4, and the structure or material of the of the fourth prism structure 4021 may be referred to those described in FIG. 8 and are not described again.

Figure 10A:
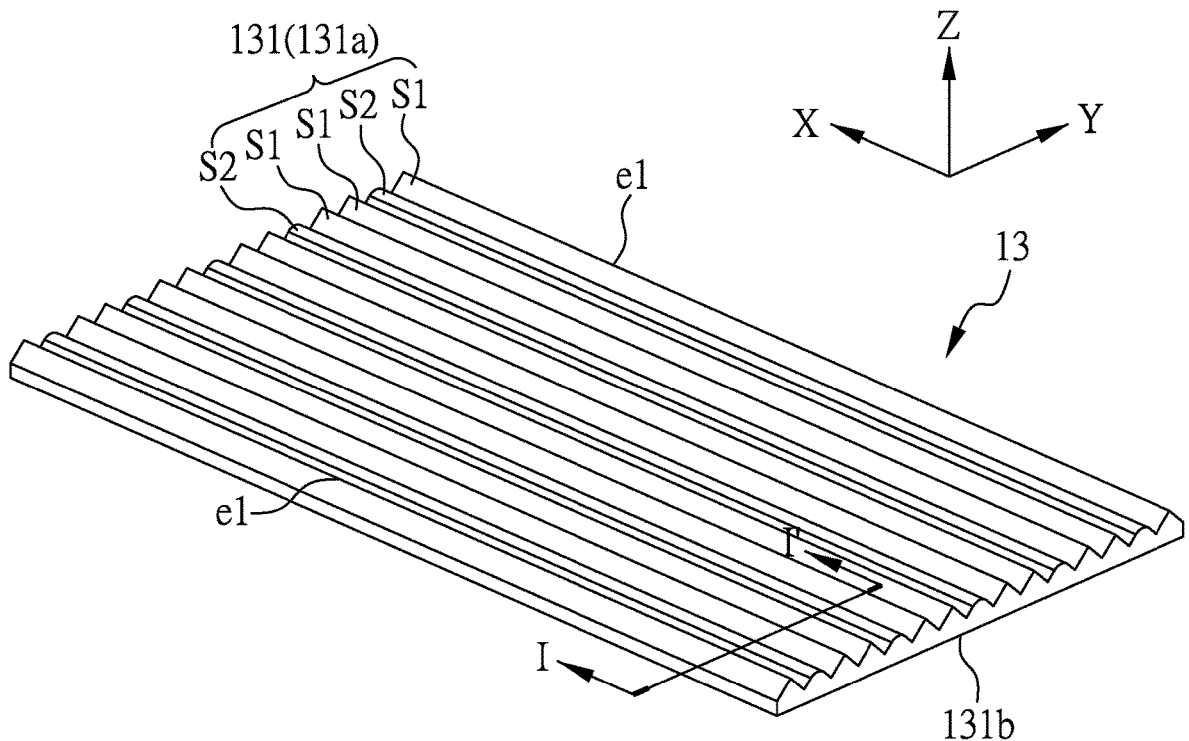
FIG. 10A is a partial schematic view of an electronic device according to one embodiment of the present disclosure.
Figure 10B:
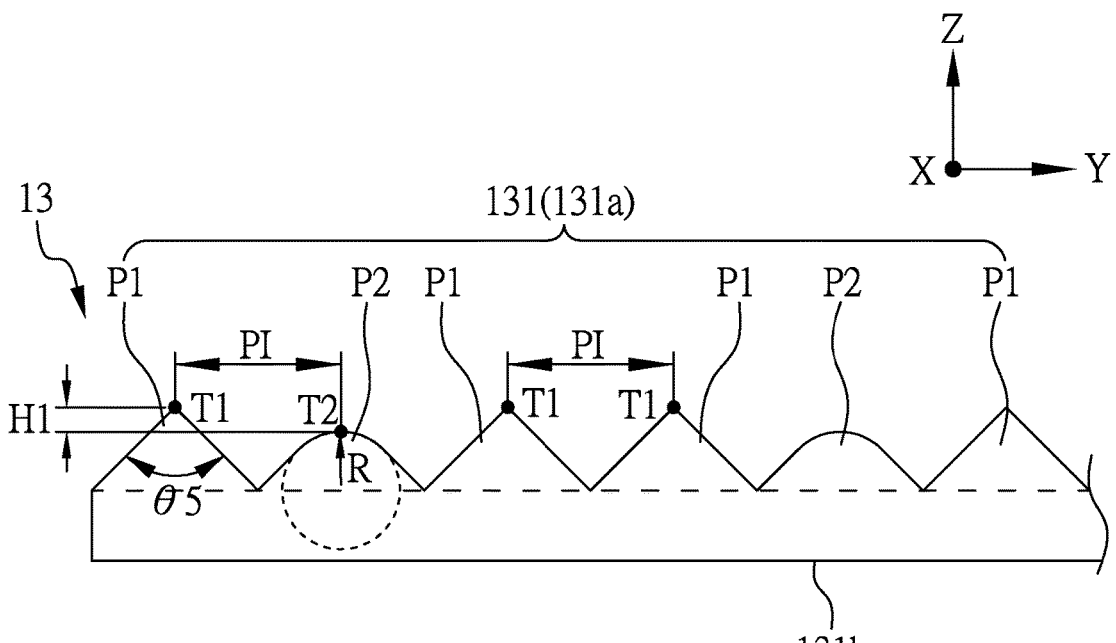
FIG. 10B is a schematic cross-sectional view of FIG. 10A along the line I-I'.

FIG. 10A is a partial schematic view of an electronic device according to one embodiment of the present disclosure. FIG. 10B is a schematic cross-sectional view of FIG. 10A along the line I-I'. The electronic device of the present embodiment is similar to that shown in FIG. 1, except for the following differences.

In the present embodiment, as shown in FIG. 10A, the third optical unit 13 has a third prism structure 131, and the third prism structure 131 faces the panel 100 (as shown in FIG. 1). The third prism structure 131 may have a plurality of third strip structures 131a and a surface 131b opposite to the third strip structures 131a, wherein the extension direction of the third prism structure 131 may be, for example, perpendicular to the first direction Y.

More specifically, as shown in FIG. 10A, the third strip structures 131a may comprise a plurality of sharp-corner strip structures S1 and a plurality of rounded-corner strip structures S2, wherein the plurality of sharp-corner strip structures S1 and the plurality of rounded-corner strip structures S2 are arranged along the first direction Y, and one of the plurality of rounded-corner strip structures S2 is disposed between two adjacent sharp-corner strip structures S1 of the plurality of sharp-corner strip structures S1. In some embodiments, at least one of the plurality of sharp-corner strip structures S1 may be disposed between two adjacent rounded-corner strip structures S2 and a number of the at least one of the plurality of sharp-corner strip structures S1 is in a range from 1 to 8. For example, as shown in FIG. 10A, two sharp-corner strip structures S1 are disposed between two adjacent rounded-corner strip structures S2, but the present disclosure is not limited thereto. In other words, in a cross-sectional view, as shown in FIG. 10B, the third prism structure 131 may comprise a plurality of sharp corner portions P1 and a plurality of rounded corner portions P2, the sharp corner portions P1 and the rounded corner portions P2 are arranged along the first direction Y, and one of the plurality of rounded corner portions P2 is disposed between two adjacent sharp corner portions P1 of the plurality of sharp corner portions P1. The sharp-corner strip structures S1 may correspond to the sharp corner portions P1, and the rounded-corner strip structures S2 may correspond to the rounded corner portions P2. In some embodiments, at least one of the plurality of sharp corner portions P1 may be disposed between two adjacent rounded corner portions P2 and a number of the at least one of the plurality of sharp corner portions P1 is in a range from 1 to 8. For example, in FIG. 10B, two sharp corner portions P1 may be disposed between two adjacent rounded corner portions P2, but the present disclosure is not limited thereto.

In addition, as shown in FIG. 10A and FIG. 10B, in a normal direction Z of the panel 100, the height of the rounded-corner strip structure S2 (i.e. the height from the top T2 of the rounded corner portions P2 to the surface 131b of the third optical unit 13) is less than the height of the sharp-corner strip structure S1 (i.e. the height from the top T1 of the sharp corner portion P1 to the surface 131b of the third optical unit 13). In some embodiments, there is a height difference H1 between the height of the rounded-corner strip structure S2 (i.e. the height from the top T2 of the rounded corner portions P2 to the surface 131b of the third optical unit 13) and the height of the sharp-corner strip structure S1 (i.e. the height from the top T1 of the sharp corner portion P1 to the surface 131b of the third optical unit 13), and the height difference H1 is greater than 0 μm and less than or equal to 2 μm (0 μm<the height difference H1≦2 μm), but the present disclosure is not limited thereto.

In some embodiments, as shown in FIG. 10B, the sharp corner portions P1 may respectively have a fifth top angle θ5, which may be in a range from 87° to 93° (87°≦the fifth top angle θ5≦93°) or in a range from 88° to 92° (88°≦the fifth top angle θ5≦92°), but the present disclosure is not limited thereto. The rounded corner portions P2 may respectively have a radius of curvature R which may be greater than or equal to 3 μm and less than or equal to 5 μm (3 μm≦the radius of curvature R≦5 μm). In addition, in some embodiments, a pitch PI between two adjacent third strip structures 131a may be in a range from 18 μm to 50 μm (18 μm≦the pitch PI≦50 μm), wherein "the pitch between two adjacent third strip structures" refers to the distance between the top T1 of the sharp corner portion P1 and the top T1 of another sharp corner portion P1 adjacent thereto in the first direction Y, or the distance between the top T1 of the sharp corner portion P1 and the top T2 of the rounded corner portions P2 adjacent thereto in the first direction Y.

In some embodiments, the surface 131b of the third optical unit 13 may be a roughness surface which has a haze in a range from 1% to 10% (1%≦haze≦10%), but the present disclosure is not limited thereto. In some embodiments, the haze of the surface 131b of the third optical unit 13 may be prepared by embossing, sandblasting or other suitable processes, but the present disclosure is not limited thereto. In addition, in some embodiments, the surface 131b of the third optical unit 13 may be a smooth surface, which may be formed by a hard coating or a PET surface.

In the present embodiment, as shown in FIG. 1, the backlight module 200 may further comprise a diffusor 14 disposed on the third optical unit 13, and a haze of the diffusor 14 may be in a range from 1% to 30% (1%≦the haze≦30%). In some embodiments, even not shown in the figure, the backlight module 200 may not comprise the diffusor 14 shown in FIG. 1. In addition, in some other embodiments, the backlight module 200 may not comprise the diffusor 14 shown in FIG. 1 but may comprise the diffusor 14-1 shown in FIG. 3A and FIG. 3B, wherein the diffusor 14-1 is disposed between the first optical unit 11 and the light guide plate 10, and a haze of the diffusor 14-1 may be in a range from 80% to 100% (80%≦the haze≦100%). In some embodiments, the diffusor 14 may be used to disperse the light emitting from the light source 20 to make the brightness of the backlight module 200 more uniform, and the diffusor 14-1 may be used to make the light concentrated to the position of the front viewing angle of the electronic device. However, the present disclosure is not limited thereto.

Figure 11:
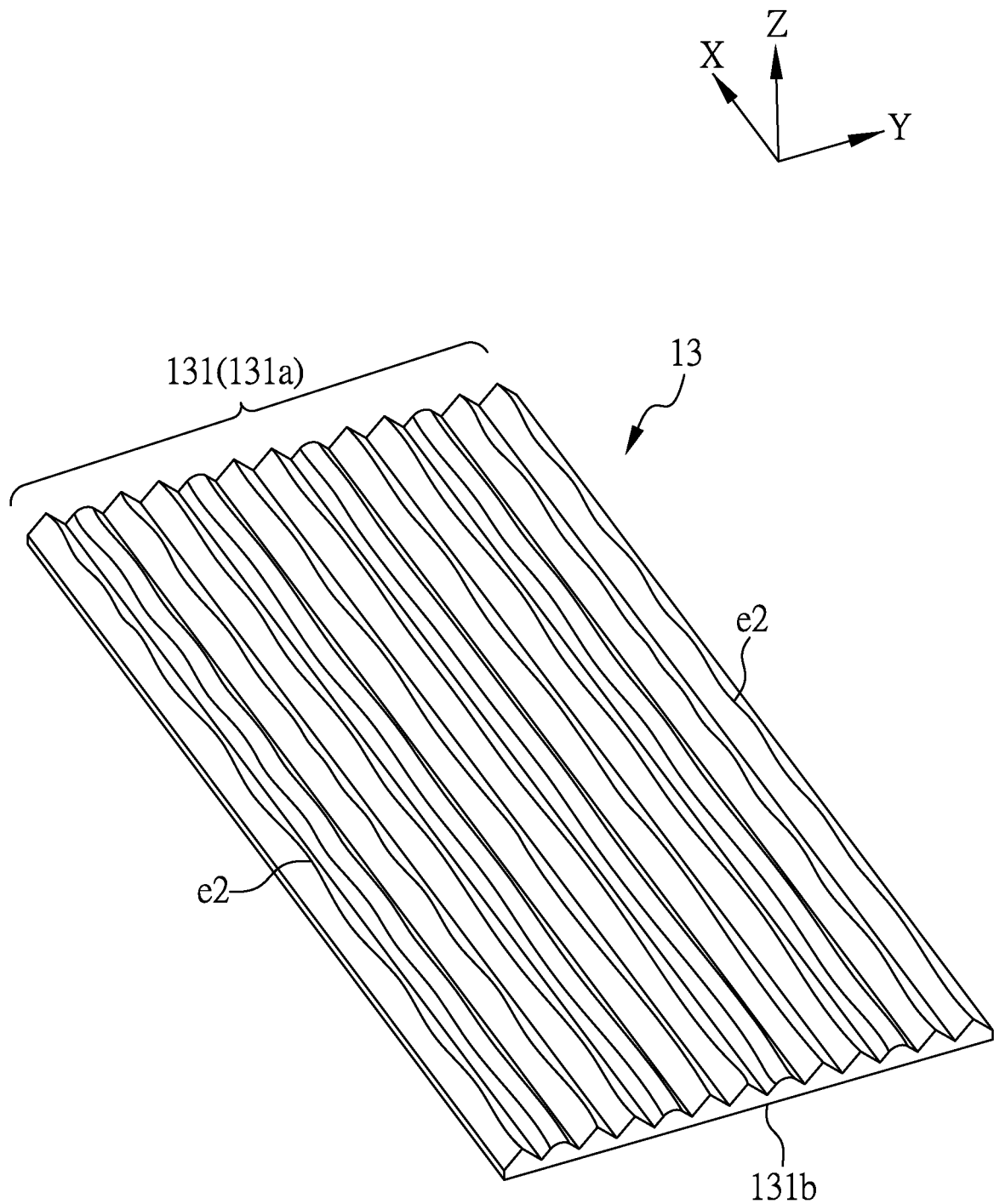
FIG. 11 is a schematic view of a third optical unit according to one embodiment of the present disclosure.

FIG. 11 is a schematic view of a third optical unit according to one embodiment of the present disclosure. The third optical unit shown in FIG. 11 is similar to that shown in FIG. 10A, except for the following differences.

As shown in FIG. 10A, the third strip structure 131a of the third prism structure 131 may have a regular structure. More specifically, the third strip structure 131a may have a top edge e1, which may be a straight edge and may be perpendicular to the first direction Y. In other words, the top edge e1 may be parallel to the extension direction of the third strip structure 131a.

In the present embodiment, as shown in FIG. 11, the third strip structure 131a of the third prism structure 131 may have an irregular structure. More specifically, the third strip structure 131a may have a top edge e2, which may not be a straight edge and may comprise, for example, a curved edge or other irregular edge. In other words, an angle may be included between the top edge e2 and the extension direction of the third strip structure 13 1a.

Herein, the top edge e1 of the third strip structure 131a shown in FIG. 10A refers to the continuation line formed by the top T1 of the sharp corner portion P1 or the top T2 of the rounded corner portion P2 along the direction X perpendicular to the first direction Y in FIG. 10B. Similarly, the top edge e2 of the third strip structure 131a shown in FIG. 11 also refers to the continuation line formed by the top T1 of the sharp corner portion P1 or the top T2 of the rounded corner portion P2 along the direction X perpendicular to the first direction Y in FIG. 10B.

The backlight module 200 of the present disclosure may be applied to various electronic device requiring a display panel, and the display panel may be, for example, a flexible display panel, a touch display panel, a curved display panel or a tiled display panel, but the present disclosure is not limited thereto. The electronic devices of the present disclosure may be, for example, monitors, mobile phones, notebook computers, video cameras, cameras, music players, mobile navigation devices, televisions and other electronic devices that need to display images, but the present disclosure is not limited thereto.

Although the present disclosure has been explained in relation to its embodiment, it is to be understood that many other possible modifications and variations can be made without departing from the spirit and scope of the disclosure as hereinafter claimed.

What is claimed is:

1. An electronic device, comprising:
    a panel; and
    a backlight module opposite to the panel and comprising:
        a light guide plate;
        a first optical unit disposed on the light guide plate and having a first prism structure;
        a second optical unit disposed on the first optical unit and having a second prism structure; and
        a third optical unit disposed on the second optical unit and having a third prism structure,
    wherein the first prism structure faces the light guide plate, and the second prism structure and the third prism structure face the panel.

2. The electronic device of claim 1, wherein the backlight module further comprises a light source, the light source comprises a plurality of light emitting units, and the plurality of light emitting units are arranged along a first direction; wherein an extension direction of the second prism structure is parallel to the first direction, and an extension direction of the first prism structure and an extension direction of the third prism structure are respectively perpendicular to the first direction.

3. The electronic device of claim 1, wherein the first prism structure has a first top angle, the second prism structure has a second top angle, and the third prism structure has a third top angle; wherein the first top angle and the third top angle are respectively in a range from 87° to 93°, and the second top angle is in a range from 50° to 60°.

4. The electronic device of claim 1, wherein a surface of the second optical unit adjacent to the light guide plate is a rough surface, and a haze of the rough surface is in a range from 3% to 15%.

5. The electronic device of claim 1, wherein the backlight module further comprises a diffusor disposed on the third optical unit, and a haze of the diffusor is in a range from 5% to 50%.

6. The electronic device of claim 5, wherein the backlight module further comprises another diffusor disposed between the first optical unit and the light guide plate, and a haze of the another diffusor is in a range from 5% to 50%.

7. The electronic device of claim 1, wherein the backlight module further comprises an adhesive layer, and the adhesive layer is disposed between the first optical unit and the second optical unit or between the second optical unit and the third optical unit.

8. The electronic device of claim 1, wherein the backlight module further comprises a grating unit disposed between the third optical unit and the panel.

9. The electronic device of claim 1, wherein the backlight module further comprises a reflective composite layer disposed between the third optical unit and the panel.

10. The electronic device of claim 1, wherein the backlight module further comprises:
    a light absorbing layer, wherein the light guide plate is disposed between the light absorbing layer and the panel; and
    a fourth optical unit disposed between the light guide plate and the light absorbing layer,
    wherein the fourth optical unit has a fourth prism structure, and the fourth prism structure faces the light guide plate.

11. The electronic device of claim 10, wherein the backlight module further comprises a light source, the light source comprises a plurality of light emitting units, and the plurality of light emitting units are arranged along a first direction; wherein an extension direction of the fourth prism structure is perpendicular to the first direction.

12. The electronic device of claim 1, wherein the backlight module further comprises a reflective structure disposed under the light guide pate.

13. The electronic device of claim 12, wherein the backlight module further comprises a fourth optical unit disposed between the reflective structure and the light guide plate.

14. An electronic device, comprising:
    a panel; and
    a backlight module opposite to the panel and comprising:
        a light guide plate;
        a first optical unit disposed on the light guide plate;
        a second optical unit disposed on the first optical unit; and
        a third optical unit disposed on the second optical unit and having a third prism structure and a surface opposite to the third prism structure,
    wherein the third prism structure comprises a plurality of sharp corner portions and a plurality of rounded corner portions, one of the plurality of rounded corner portions is disposed between two adjacent sharp corner portions of the plurality of sharp corner portions, and a height from one of the plurality of rounded corner portions to the surface of the third optical unit is less than a height of one of the plurality of sharp corner portions to the surface of the third optical unit in a normal direction of the panel.

15. The electronic device of claim 14, wherein there is a height difference between the height from the one of the plurality of rounded corner portions to the surface of the third optical unit and the height of the one of the plurality of sharp corner portions to the surface of the third optical unit, and the height difference is greater than 0 μm and less than or equal to 2 μm.

16. The electronic device of claim 14, wherein the plurality of rounded corner portions respectively have a radius of curvature which is greater than or equal to 3 μm and less than or equal to 5 μm.

17. The electronic device of claim 14, wherein at least one of the plurality of sharp corner portions is disposed between two adjacent rounded corner portions of the plurality of rounded corner portions and a number of the at least one of the plurality of sharp corner portions is in a range from 1 to 8.

18. The electronic device of claim 14, wherein the surface of the third optical unit is a roughness surface which has a haze in a range from 1% to 10%.

19. The electronic device of claim 14, wherein the backlight module further comprises a diffusor disposed on the third optical unit, and a haze of the diffusor is in a range from 1% to 30%.

20. The electronic device of claim 14, wherein the backlight module further comprises another diffusor disposed between the first optical unit and the light guide plate, and a haze of the another diffusor is in a range from 80% to 100%.

* * * * *